United States Patent

Greene et al.

[11] Patent Number: 4,673,428
[45] Date of Patent: Jun. 16, 1987

[54] METHOD AND APPARATUS FOR FORMING GLASS FIBERS

[75] Inventors: Neil E. Greene, Granville; Lawrence J. Grubka, Heath; Randall E. Nyhart, Granville, all of Ohio

[73] Assignee: Owens-Corning Fiberglas Corporation, Toledo, Ohio

[21] Appl. No.: 809,998

[22] Filed: Dec. 17, 1985

[51] Int. Cl.⁴ .............................................. C03B 37/02
[52] U.S. Cl. .................................................. 65/2; 65/1; 210/420
[58] Field of Search ......................... 65/1, 2; 210/420

[56] References Cited

U.S. PATENT DOCUMENTS

| | | | |
|---|---|---|---|
| 2,294,266 | 8/1942 | Barnard | 65/1 |
| 2,453,864 | 11/1948 | Schlehr | 65/1 X |
| 2,465,283 | 3/1949 | Schlehr | 65/1 |
| 3,012,373 | 12/1961 | Willis | 65/1 |
| 3,269,816 | 8/1966 | Helbing | 65/2 |
| 3,294,503 | 12/1966 | Machlan et al. | 65/1 |
| 3,478,389 | 11/1969 | Bradley et al. | 65/2 X |
| 3,573,014 | 3/1971 | Strickland et al. | 65/1 |
| 4,436,541 | 3/1984 | Pellagrin et al. | 65/2 |
| 4,488,891 | 12/1984 | Grubka et al. | 65/2 |
| 4,553,994 | 11/1985 | Greene et al. | 65/2 |

Primary Examiner—Robert Lindsay
Attorney, Agent, or Firm—Ronald C. Hudgens; Greg Dziegielewski; Ronald E. Champion

[57] ABSTRACT

A feeder for the production of glass filaments is provided with a shallow layer of glass over the discharge wall in combination with a fluid filled cavity capable of being pressure regulated to render the operation dripless or non-dripless as desired. Preferably, the feeder is rendered non-dripless when the restart of filament formation from idled orifices is desired.

8 Claims, 6 Drawing Figures

METHOD AND APPARATUS FOR FORMING GLASS FIBERS

TECHNICAL FIELD

The invention disclosed herein relates to the production of glass fibers wherein process interruptions from bead drops and flooding are reduced while providing improved restartability.

BACKGROUND OF THE INVENTION

In the production of glass filaments, it is conventional to flow streams of molten glass from closely spaced orifices in the bottom or discharge wall of an electrically heated, precious metal alloy feeder or bushing.

For the production of continuous glass filaments, there are two general types of feeders available. The more widely used type employs a bottom wall having stream defining orifices provided in projections or tips, depending from the exterior surface of the bottom wall. The second, a more recently developed type, employs an orificed bottom wall having a planar exterior surface. The first type is known as a "tipped" feeder; for example, see U.S. Pat. Nos. 4,222,757 and 4,321,074. The second type of feeder is known as a "tipless" feeder; for example, see U.S. Pat. No. 3,905,790.

Historically, glass fiber forming operations have been plagued by primarily two phenomena occurring after a filament break--flooding and bead drops.

Recently, a glass fiber forming system has been developed that dramatically reduces the effects of disruptive filament breaks. U.S. Pat. No. 4,488,891, issued to Grubka et al, discloses a fiber forming system otherwise known as "dripless". That is, during operation if a filament breaks, the glass will cease to flow from the orifice associated with the break while attenuation is maintained from the remaining orifices. Thus, the glass does not drip from the orifice of the severed filament.

The advantages of such a system are clear. One of the disadvantages is increased "restart" times, as compared to conventional feeders, when the number of filament breaks ultimately requires the restart of the attenuation process at the disrupted/idled orifices.

SUMMARY OF THE INVENTION

This invention provides, in part, the decreased sensitivity to filament breaks provided by the "dripless" types of feeders while also providing, in part, the ease of "restartability" provided by the heretofore "conventional" or "non-dripless" types of feeders.

This is accomplished by establishing a shallow layer of molten glass over an orificed discharge wall to provide the streams of molten glass for attenuation into filaments, the top surface of the layer being in contact with a body of fluid and controlling the pressure of the body of fluid to establish "dripless" operation during production and "non-dripless" operation to facilitate the restart of filament formation as desired.

BEST MODE OF CARRYING OUT THE INVENTION

Figure 1:
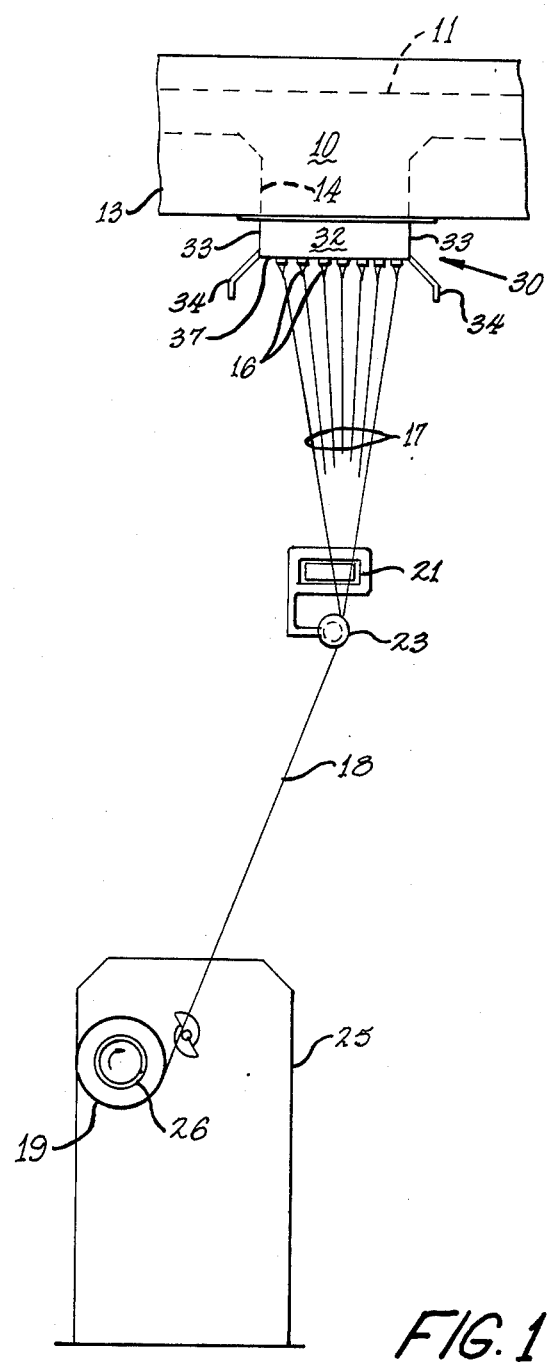
FIG. 1 is a schematic front elevational view of a glass fiber forming operation.

As shown in FIG. 1, conically shaped streams of molten glass 16, otherwise known as forming cones issuing from feeder 30, are attenuated into a plurality of filaments 17 through the action of attenuation means or winder 25. The newly formed filaments 17 receive a protective coating or sizing from coating applicator 21 as is known in the art. The coated filaments 17 are then gathered into a strand 18 at gathering means 23, which is collected as a helically wound package 19 on collet 26 of winder 25.

As such, the filaments formed are continuous filaments. However, it is to be understood that feeders employing the principles of the present invention are also readily applicable to the formation of discontinuous filaments and/or association with other attenuation means. Further, such feeders may be employed in the fiberization of other inorganic materials.

For the purposes of clarity, no cooling system for cooling the forming region and the newly formed glass fibers is shown. However, it is to be understood that any suitable cooling system, such as finshields and/or convective air cooling, may be employed.

As shown in FIG. 1, feeder 30 is positioned in the refractory of channel 13 which carries the body or pool of molten glass 10 to feeder 30 from a furnace (not shown).

As will be explained in more detail later herein, the head of the body of molten glass 10, that is, the depth of the glass from top surface 11 to plate 48, preferably remains substantially constant with the present invention providing adjustable control of the effective head pressure of a separate layer of molten glass 42 at the discharge wall 37.

Figure 2:
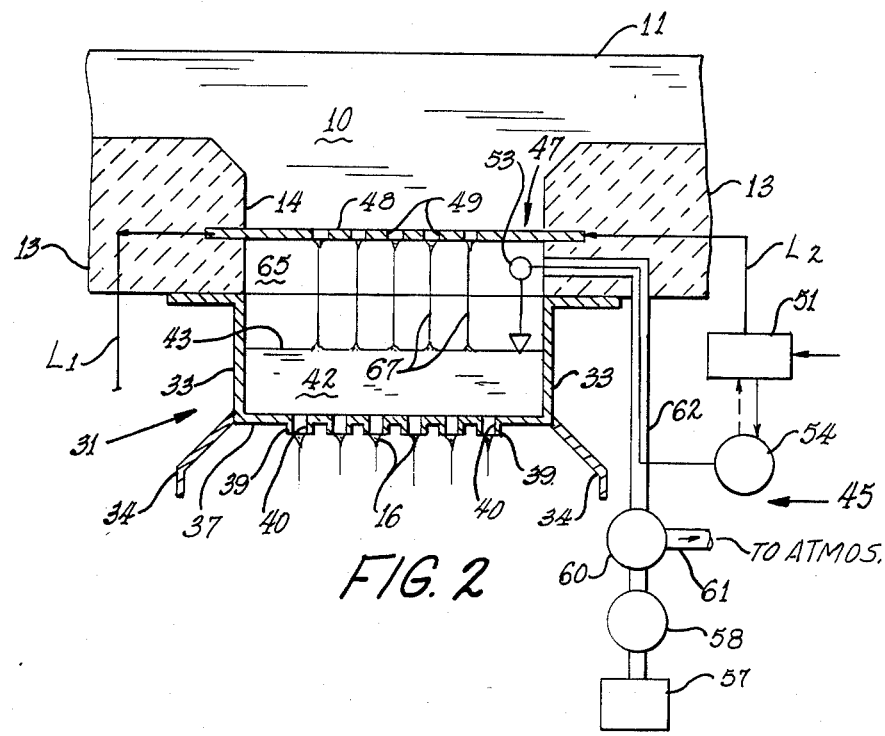
FIG. 2 is an enlarged cross-sectional view of the feeder system shown in FIG. 1.

As shown in FIG. 1 and 2, feeder means 30 is, in part, comprised of sidewalls 32, endwalls 33 and a discharge wall 37 forming a container 31 to retain the molten glass therein. As is known in the art, a pair of terminals or ears 34 are suitably attached to endwalls 33 (or discharge wall 37). Ears 34 are adapted to be connected to a suitable source of electrical energy (not shown) to provide electrical resistance heating of the feeder 30. Discharge wall 37 includes a plurality of projections 39 depending therefrom. Each projection 39 has at least one orifice 40 adpated to permit the molten glass to issue therefrom as a stream 16. It is to be understood that the present invention is readily employed with "tipless" feeders also.

According to the principles of this invention, feeder means 30 is designed to provide dripless and non-dripless operating characteristics when desired. Specifically, feeder 30 is rendered non-dripless when the restart of filament attenuation is desired from idled orifices, that is, orifices at which filament attenuation has been disrupted.

With regard to "dripless" operation, aforementioned U.S. Pat. No. 4,488,891, which is hereby entirely incorporated herein by reference, describes in detail the parameters for producing "dripless" operation. Dripless operation is established, according to the principles of this invention, by providing a layer of molten glass over the discharge wall such that the pressure of the molten glass at the orifices is less than the internal pressure of a bead formed at an orifice upon the cessation of filament attenuation at that orifice but greater than the internal pressure of the forming cones during attenuation. As such, the pressure of the molten glass at the discharge plate orifices prevents bead growth and drop from the orifices whereby the flow of molten glass from the disrupted orifices ceases. In other words, for "dripless" operation, the pressure of the molten glass at the orifices of the discharge wall is (1) less than the internal pressure of the bead formed at a given orifice upon breakout at that orifice while the remainder of the orifices operate normally to produce filaments, and (2) greater than the internal pressure of the cones established during steady state attenuation.

Conveniently, the appropriate "dripless" pressure is created by establishing a layer of molten glass over an orificed discharge wall to provide the streams of molten glass for attenuation into filaments, the surface of the layer being in contact with a body of fluid and controlling the pressure of the body of fluid to establish an effecting head pressure at the discharge orifices sufficient to establish "dripless" operation during production and "non-dripless" operation to facilitate restart of filament formation from disrupted orifices as desired.

Desirably, the depth of layer of glass 42 and the pressure of fluid in cavity 65 acting on layer 42 during filament production/attenuation are provided or established such that the pressure at the exit ends of the orifices 40 of the discharge wall 37 preferably is substantially atmospheric for dripless operation. As such, upon a filament break at one of the orifices, the flow of molten glass from that orifice stops yet the pressure is sufficient for maintenance of fiber formation at the remaining orifices, hence "dripless."

As employed herein, "non-dripless" refers to the characteristic of the feeder system wherein molten glass begins to flow or continues to flow from an orifice 40 to form a dripable bead or flow randomly over the face of the discharge wall 37 if no filament is being drawn at that orifice. As such, the pressure of the molten glass at the orifices 40 of discharge wall 37 is greater than the internal pressure of a bead formed at one of such orifices. This facilitates or permits the initiation or restart of filament production from the orifices.

As shown in FIGS. 1 and 2, container 31 abuts the refractory of channel 13 at well 14. In this embodiment, control system 45 is adapted to control the level or depth of the layer of glass 42 in cavity 65 of container 31 as well as the pressure of the fluid in cavity 65 in contact with layer 42.

As part of control system 45, flow control means 47 is comprised of a plate 48 extending across well 14 to separate body of molten glass 10 from layer of molten glass 43, intermediate plate 48 is spaced from layer 43.

Plate 48 has a plurality of apertures 49 therethrough to permit the molten glass of body 10 to enter cavity 65 as a plurality of supply streams 67. The size and number of apertures 49 are chosen so that the flow of molten glass from body 10 into cavity 65 is approximately balanced with the discharge of the molten streams 16 from orifices 40. Layer of molten glass 42 covers discharge wall 37 and partially fills cavity 65 to a predetermined level. As shown, the remainder of cavity 65 extends from the top surface 43 of layer of glass 42 to plate 48 which is preferably designed to accommodate the controlled pressurization of the cavity according to the principles of this invention.

In addition to plate 48, flow control means 47 is also comprised of power source 51, glass level sensor 53 and source of pressurized fluid 57. The flow rate of molten glass from body 10 into cavity 65 is varied by adjusting the temperature of plate 48 by controlling the electrical power applied to plate 48 from electrical power source via leads L1 and L2. As the temperature of plate 48 is increased, heat is transferred to the molten glass in body 10 at plate 48 which reduces the viscosity of the glass at that point causing an increase in the flow of molten glass from body 10 into cavity 65 and, thus, layer of molten glass 42.

Glass level sensor 53 is adapted to sense the level or depth of layer of molten glass 42. Controller 54 controls the amount of power applied from power source 51 to plate 48 in response to such sensing. Thus, the level of molten glass layer 42 is maintained substantially constant at a level or depth to establish "dripless" operation during filament production.

To facilitate the restart of filament formation from idled orifices, the effective head pressure at orifices 40 of molten glass layer 42 is increased by increasing the pressure of the working fluid above and in contact with molten glass layer 42 in cavity 65. Conveniently, the fluid in cavity 65 may be pressurized from a source of pressurized fluid or gas 57 which is preferably controlled via any suitable regulator 58. As shown, regulator 58 is located intermediate fluid pressure source 57 and a three-way valve 60. Valve 60 is in communication with cavity 65 via conduit 62 to permit cavity 65 to be pressurized to the desired extent at the desired times.

During production operation, cavity 65 is vented to the atmosphere via valve 60 and conduits 61 and 62. Thus, the effective head pressure differential at orifices 40 is merely the head pressure exerted by the layer of molten glass 42. After a sufficient number of filaments have broken, the flow of molten glass from the idled orifices 40 associated with those broken filaments may be quickly restarted by actuating valve 60 to close conduit 61 and connect conduit 62 with the pressure source 57 via regulator 58.

Desirably, the pressure exerted by the working fluid in cavity 65 is less than the head pressure of the molten glass of body 10 at apertures 49 of plate 48 to prevent the working fluid from being transferred or forced into the body of molten glass 10 through apertures 49. In response to that increase in the pressure of the working fluid in cavity 65, the effective head pressure of the molten glass layer 42 at orifices 40 is increased such that the feeder now operates in a "non-dripless" manner. As such, molten glass flows from the idled orifices permitting the restart of filament formation from the idled orifices. Once filament production has been restarted, the pressure of the working fluid in cavity 65 is returned to its production level by actuating valve 60 to close off regulator 58 and connect conduit 62 with conduit 61 which is shown vented to the atmosphere. Thus, feeder 30 can be operated in a dripless or non-dripless manner as desired.

Preferably, the working fluid in this system is a gas, such as air. It is to be understood, however, that any suitable liquid or gas may be employed as long as the liquid or gas provides the suitable control and meets the other requirements of the process.

Figure 3:
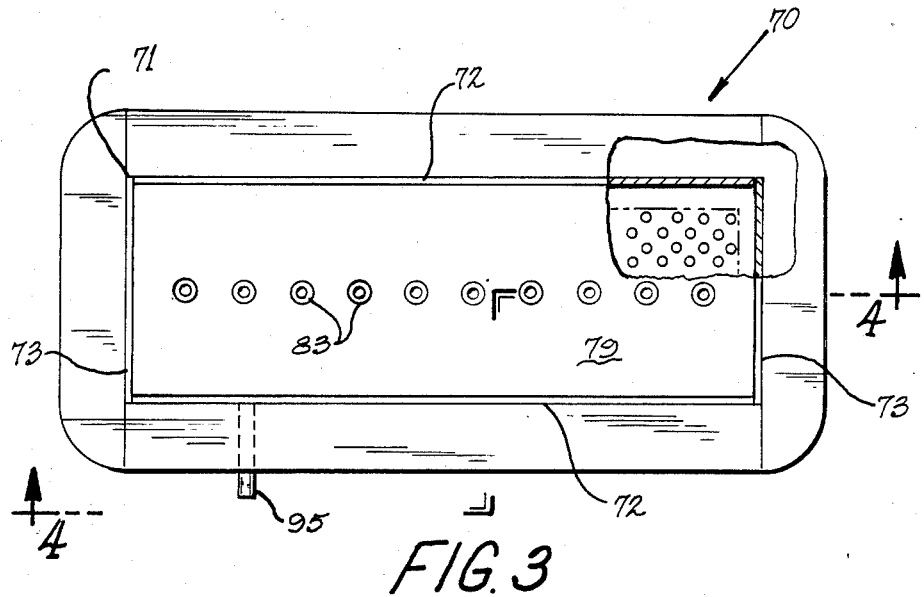
FIG. 3 is an cross-sectional top view of another feeder system designed according to the principles of this invention.
Figure 4:
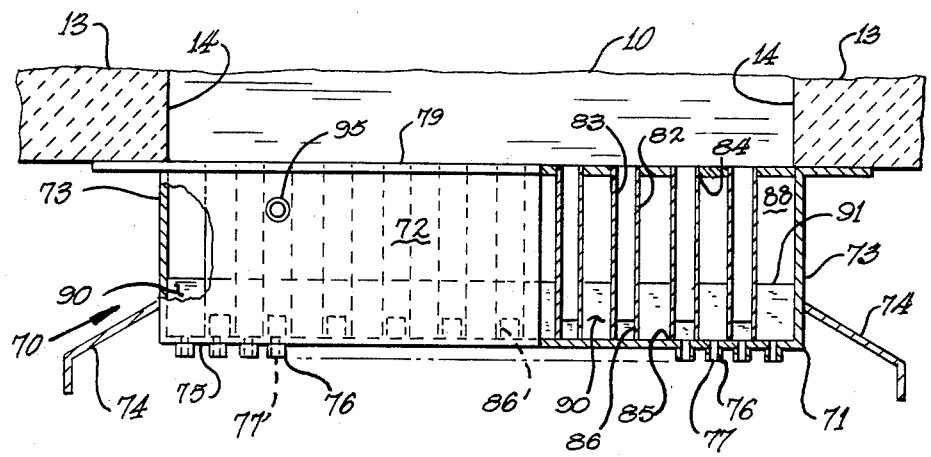
FIG. 4 is an enlarged cross-sectional view of the feeder shown in FIG. 3 taken along view 4—4.

As shown in FIGS. 3 and 4, feeder 70, designed according to the principles of this invention, is comprised of side wall 72, end walls 73 and discharge wall 75 which, in part, form housing or container section 71. In this embodiment, however, apertured partition or plate 79, which functions to control the flow of molten glass into cavity 88, is joined to side wall 72 and end walls 73.

Similar to embodiment of FIG. 2, apertured partition 79 is designed to restrict the flow of molten glass from body 10 located in well 14 of channel 13 into cavity 88 at a flow rate substantially equal to the flow rate of molten glass issuing from orifices 77 in projection 76 of discharge wall 75.

Tubular membes 82 have been provided to reduce any tendency of the working fluid, air to create or inject bubbles of air in the supply streams of molten glass flowing downwardly from partition 79 into layer 90. Tubular members 82, which have an aperture 83 extending therethrough, have a first end 84 securely joined to partition 79 and a second or distal end 85 extending downwardly to a region under the top surface 91 of layer of molten glass 90. As shown, second end 85 of tubular member 82 is joined to discharge wall 75 to provide additional structural integrity to restrict the discharge wall 75 from bowing downwardly. As such, second end 85 is provided with a slot or recess 86, which is located completely beneath surface 91 of layer 90, to permit the molten glass to issue from tubular member 82 under surface 91 in cavity 88. As such, only the top surface 91 of layer 90 comes in contact with the working fluid of cavity 88. Desirably, the depth of layer 90 is established such that recess 86 is not exposed to cavity 88 at any time during operation.

Similarly, feeder 70 is designed such that the depthof layer 90 provides a head pressure at orifices 77, to operate in a "dripless" manner when the working fluid in cavity 88 is at approximately atmospheric pressure. To facilitate restart, the feeder 70 is rendered "non-dripless" by increasing the pressure of the air in cavity 88, which, in turn, increases the effective head pressure of the molten glass layer 90 at orifices 77. This, in turn, causes the molten glass to quickly start to flow from the idled orifices thus permitting the restart of filament attenuation from such orifices. Once filament attenuation has been restarted, cavity 88 is depressurized by deactivating the source of pressurized air and then venting the cavity to be atmosphere. As shown, cavity 88 is pressurized and depressurized through conduit 95 which is suitably connected to a regulated source of pressure (not shown).

An alternative, but slower, method of pressurizing cavity 88 is comprised of sealing the cavity after steady state, dripless production operation has been effected. Upon sealing cavity 88, the air or gas in the cavity is at a first pressure as filaments break and the flow of glass into cavity 88 exceeds the flow of glass out of cavity 88 the volume of glass, and thus the depth of layer 90, increases which, in turn, reduces the space available for the gas. This causes the pressure of the gas to correspondingly increase. Eventually the gas pressure will increase to the point of establishing non-dripless operation.

Figure 5:
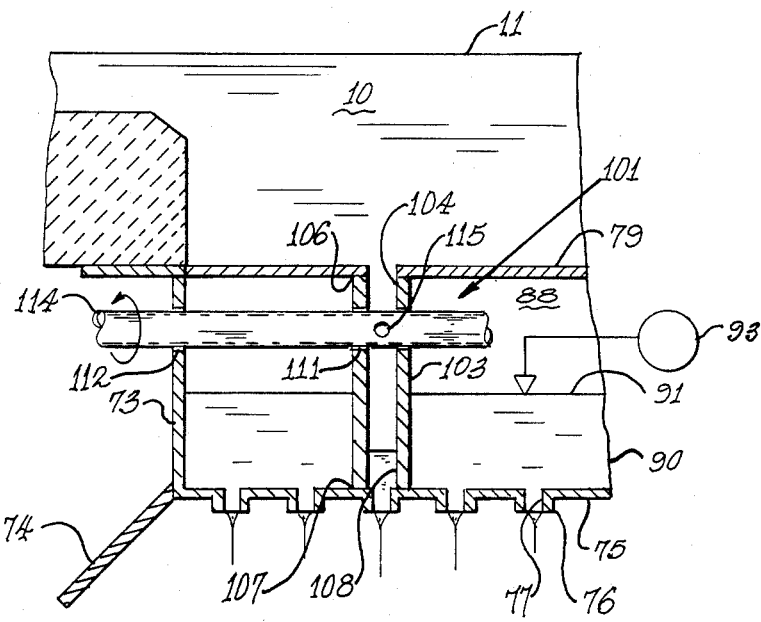
FIG. 5 is a partial, enlarged cross-sectional frontal view of a feeder similar to that shown in FIG. 4 but having a mechanically adjustable flow control means associated therewith.

FIG. 5 illustrates a modification to the fiber forming feeder shown in FIG. 4 that permits (1) the flow of molten glass from body 10 into cavity 88 to be mechanically varied or controlled and (2) cavity 88 to be connected to a source of positive pressure and/or vacuum. Accordingly, the feeder 70 is equipped with a plurality of variable or adjustable glass flow regulator 101 in place of tubular members 83 of FIGS. 3 and 4.

Flow regulator 101 is comprised of tubular member 103 having a first end 106 suitably joined to apertured partition or plate 79 and a second end 107 having a slot or recess 108 therein suitably joined to discharge wall 75. Aperture 04 extends through tubular member 103 and plate 79 and is in communication with recess 108 to permit molten glass from body 10 to enter quiescently into cavity 88 beneath top surface 91 of molten layer of glass 90. The tubular members 103 are also equipped with a transverse bore 111 therethrough adapted to receive shaft 114 which has a port 115 extending transversely therethrough. Ports 115 are designed such that shaft 114 cooperates with tubular member 103 to form a mechanical valve for controlling the glass flow therethrough. Desirably, ported shaft 114 is arranged such that the flow of glass through aperture 104 may be completely stopped. Other degress of flow restriction may be acceptable, however.

As shown, shaft 114 extends through side wall 73 at bore 112 and is designed for rotational movement. It is to be understood that other flow restrictor arrangements as set forth in concurrently filed U.S. patent application Ser. No. 809,961 filed in the names of Jerome F. Marra and William M. Babbitt, which is hereby incorporated by reference in its entirety.

With flow regulator 101 closed, that is, aperture 104 completely blocked by shaft 114, cavity 88 may be pressurized to a pressure greater than the head pressure of the molten glass of body 10 at partition 79. Thus, the flow of molten glass can be restarted from the idled orifices even more rapidly via increased such pneumatic/hydraulic stimulation.

The flow of molten glass from body 10 into cavity 88 may be adjustably controlled by varying the degree of opening of port 115 to apertures 104. Additionally, the level or depth of layer of molten glass 90 is sensed by glass level sensor 93 which may be coupled to a display system which is read by the forming room operator. The operator can then manually adjust shaft 114 as required to maintain the desired "dripless" producing level of glass over discharge wall 75. Alternatively, sensor 93 may be coupled with electromechanical means for automatically adjusting the position of shaft 114 to control the flow of molten glass through flow regulator 101 to control the depths of layer 90.

With the modifications shown in FIG. 5, the portion of cavity 88 not filled with molten glass 90 may be maintained at a partial vacuum thus enabling the layer of molten glass 90 to be maintained at a greater depth than if cavity 88 was at atmospheric pressure. One benefit of operating cavity 88 at a partial vacuum is that the volume of glass in layer 90 can be correspondingly greater which increases the residence time of the molten glass of layer 90 in contact with discharge wall 75. Such increased residence or contact time provides more time to thermally condition the molten glass 90 through the control of temperature of discharge wall 75 immediately prior to issuing from orifices 77.

As with the previously discussed embodiments, the working gas in cavity 88 may be increased in pressure by venting the cavity to the atmosphere or connecting the cavity to a source of positive pressure to provide the "non-dripless" manner of operation to facilitate restart.

Accordingly, after restart is achieved, the desired subatmospheric pressure of the gas working in cavity 88 is re-established to provide for dripless operation.

Figure 6:
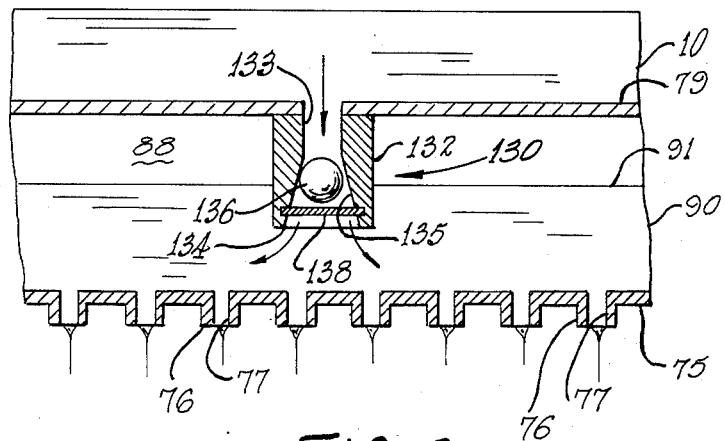
FIG. 6 is a partial, enlarged cross-sectional frontal view of yet another embodiment according to the principles of this invention containing a back flow check valve system.

FIG. 6 illustrates a check valve means 130 for preventing the blowback of the working fluid in cavity 88 into the body of molten glass 10. Thus, as stated before, the gas filled portion of chamber 88 may be pressurized by pressure greater than the head pressure of the molten glass 10 at plate 79.

Check valve means 130 is comprised of a tubular member 132 having an aperture 133 extending through tubular member 132 and plate 79. In this embodiment, distal end 134 of tubular member 132 is spaced from discharge wall 75 but is still located beneath top surface 91 of layer of molten glass 90. Aperture 133 of tubular member 132 forms a tapered seat 135 near distal end 134. Ball 136, which has a diameter greater than the diameter of aperture 133, is free to move along the length of tapered seat 135. During production as the filaments are being formed, ball 136 is urged downwardly along tubular member 132 by the flow of molten glass. Pin 138, located transversely in tubular member 132, keeps ball 136 from exiting tubular member 132.

The flow of molten glass may be restarted from all idled orifices by pressurizing the gas filled portion of cavity 88 as described hereinbefore. When the pressure of the gas filled portion of cavity 88 is greater than the effective head of the body of molten glass 10 at plate 79, the molten glass of layer 90 will be urged upwardly through aperture 133. Ball 136, however, by the reverse flow of molten glass, will be urged into the narrow end of tapered seat 135 thus blocking the flow of molten glass therethrough before the pressurized gas in cavity 88 can flow into body of molten glass 10.

As illustrated, the supply body of molten glass 10 is coextensive with well 14 and partition 79. It is to be understood that a feeder designed according to the principles of this invention may be supplied through any suitably configured arrangement such as a conduit connecting, for example, feeder 70 with a remote source of glass.

It is apparent that, within the scope of the present invention, modifications and different arrangements can be made other than as herein disclosed. The present disclosure is merely illustrative with the invention comprehending all variations thereof.

INDUSTRIAL APPLICABILITY

The invention described herein is readily applicable to the glass fiber industry.

We claim:

1. A method of forming glass filaments comprising: establishing a layer of molten glass over an orificed discharge wall adapted to provide streams of molten glass for attenuation into filaments, the depth of the layer of molten glass providing a head pressure at the orifices of the discharge wall effective to establish dripless operation, the top surface of the layer being in contact with a body of fluid; providing a body of molten glass immediately above said fluid; and providing a flow control means for controlling the pressure of the fluid such that the effective head pressure of the glass at the discharge wall is increased to establish non-dripless operation to facilitate the restart of the flow of molten material from orifices at which attenuation has been disrupted, wherein said flow control means includes a backflow regulator means adapted to permit the pressure of the fluid to be increased to a pressure greater than the effective bead pressure of the body of glass at said flow control means.

2. Apparatus for the production of filaments from molten inorganic material comprising:
a container having a cavity therein and an orificed discharge wall adapted to issue streams of molten inorganic material therefrom for attenuation into filaments; said container further comprises a partition and a plurality of tubular members having an aperture therethrough in communication with (a) a well adapted to contain a body of molten materials and (b) said cavity, said partition being located between said well and said cavity, said tubular numbers having a first end attached to said partition and a second end positioned such that the second end thereof is located within the layer of molten material; means for establishing a layer of the molten material along the discharge wall in said cavity, a portion of the cavity being filled with a fluid in contact with the layer; and means for controlling the pressure of the fluid to establish an effective bead pressure of the layer of molten material at the orificed discharge well to provide dripless operation during production and non-dripless operation to facilitate restart of filament formulation as desired.

3. The apparatus of claim 2 wherein the second end of the tubular members is joined to said discharge wall to provide structural support therefor.

4. The apparatus of claim 2 wherein said container further comprises: a portion located between (a) a well adapted to contain a body of the molten material; and (b) said cavity, said portion having a plurality of aperatures providing communication between the wall and the cavity; and a backflow regulator means adapted to prevent the transfer of the fluid in the cavity to the well upon pressurization of the fluid in the cavity.

5. The apparatus of claim 4 wherein the backflow regulator means is a check valve.

6. The apparatus of claim 2 further comprising an adjustable mechanical valve means associated with the tubular members for preventing the transfer of the fluid in the cavity to the well upon pressurization of the cavity.

7. The apparatus of claim 2 further comprising mechanical valve means for adjustably restricting the flow of molten material from the body to the layer to control the level of the layer of molten material in the cavity.

8. The apparatus of claim 7 wherein said valve means is adapted to permit the cavity to be operated under a partial vacuum to establish dripless operation.

* * * * *